(12) United States Patent
Falkenberg et al.

(10) Patent No.: US 7,376,045 B2
(45) Date of Patent: May 20, 2008

(54) SYSTEM AND METHOD FOR DETERMINING POSITIONS OF TOWED MARINE SEISMIC STREAMERS

(75) Inventors: Jon Falkenberg, Jar (NO); Nils Lunde, Houston, TX (US); Per Birger Gunnarsson, Barsebäck (SE); Nils Gunnar Olof Kröling, Lund (SE); Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/256,390

(22) Filed: Oct. 21, 2005

(65) Prior Publication Data

US 2007/0091719 A1   Apr. 26, 2007

(51) Int. Cl.
   *G01V 1/38* (2006.01)
   *H04R 1/44* (2006.01)
(52) U.S. Cl. .................. 367/19; 367/124; 367/129; 367/130
(58) Field of Classification Search .................. 367/19, 367/129, 130, 124, 127
   See application file for complete search history.

(56) References Cited

U.S. PATENT DOCUMENTS

| | | | |
|---|---|---|---|
| 4,187,492 A | 2/1980 | Delignieres | |
| 4,231,111 A | 10/1980 | Neeley | |
| 4,398,274 A * | 8/1983 | Chotiros | 367/90 |
| 4,912,682 A | 3/1990 | Norton, Jr. et al. | |
| 4,992,990 A | 2/1991 | Langeland et al. | |
| 5,668,775 A | 9/1997 | Hatteland | |
| 5,761,153 A | 6/1998 | Gikas et al. | |
| 6,157,592 A | 12/2000 | Kriz et al. | |
| 6,697,300 B1 | 2/2004 | Holt | |
| 6,771,563 B1 * | 8/2004 | Bernard | 367/131 |
| 6,839,302 B2 | 1/2005 | Austad et al. | |

FOREIGN PATENT DOCUMENTS

GB   2 396 014   6/2004

* cited by examiner

*Primary Examiner*—Ian J. Lobo
(74) *Attorney, Agent, or Firm*—E. Eugene Thigpen; Charles R. Schweppe

(57) ABSTRACT

A system comprises a plurality of acoustic transmitters, mounted inside the streamers, adapted to transmit broadband signals having low cross-correlation between the signals of different transmitters; a plurality of acoustic receivers, mounted inside the streamers, adapted to receive the signals from the transmitters; at least one processor adapted to cross-correlate the signals received at the receivers with copies of transmitter signals to determine identities of the transmitters of the received signals and to determine travel times of the received signals; and a main processor adapted to convert the travel times to distances between the identified transmitters and the receivers and to determine relative positions of the streamers from the distances.

22 Claims, 9 Drawing Sheets

SYSTEM AND METHOD FOR DETERMINING POSITIONS OF TOWED MARINE SEISMIC STREAMERS

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic data acquisition.

2. Description of the Related Art

To perform a three-dimensional (3D) marine seismic survey, a plurality of marine seismic streamers are towed at a preset depth, typically between 4 and 25 meters, behind a surface survey vessel. Each seismic streamer, also referred to as a streamer cable, is typically several thousand meters long and contains a series of seismic sensors and associated analog-to-digital signal converter electronics distributed along the streamer length. The streamer cables comprise a series of individual segments, called streamer sections, each typically 75 to 200 meters long. The survey vessel also tows one or more seismic sources, for example air guns or water guns, but most commonly consisting of arrays of air guns. Acoustic signals generated by the seismic sources are transmitted down through the water column and several more kilometers down into the subterranean formations. Parts of the signals are reflected from the interfaces between various strata, due to differences in the acoustic impedance between different rock formations. The acoustic signals reflected from the subterranean formations are detected by the seismic sensors located within the streamers. The acquired seismic signals are digitized and sent via a main telemetry link to the survey vessel for data processing onboard or later processing onshore. The processed data is used for estimating the subterranean formation structure and possible hydrocarbon content.

FIG. 1A illustrates a top schematic view of an ideal case, with no cross-currents, of a 3D marine seismic survey using towed streamers. A seismic survey vessel 1 tows a relatively small seismic tow system which comprises an active source consisting of three air gun arrays 2, and a spread of four streamer cables 3. The streamer cables 3 extend from streamer separation doors (also referred to as deflectors) 4 at the front of the spread to tail buoys 5 at the rear. In this ideal case, the streamer cables 3 all extend behind the vessel 1 in unrealistically straight and equally spaced lines parallel to the vessel track and to each other. FIG. 1B illustrates a top schematic view of a more realistic case of a 3D marine seismic survey using towed streamers, showing the typical effects of cross-currents on the streamer spread. The separations between the streamers 3 are no longer constant and the positions of the tail segments deviate from the vessel track. This deviation effect is called "feathering". The tail segments of the streamers can, in some survey areas, deviate significantly from the vessel track due to the cross-currents along the tow spread.

For correct seismic imaging of the sub-bottom beneath the survey area, it is important to accurately determine the position of both the air gun sources and the seismic receivers. The seismic sources are towed relatively closely behind the survey vessel and are easier to control than the streamer spread. Streamer spreads typically consist of 8 to 12 independently towed streamer cables, with each streamer being 3 to 8 kilometers long. However, the trend is to deploy even more and longer streamers, such as up to 20 streamers of approximately 12 kilometers length. Accurate determination of streamer positions is also important in avoiding high risk operational situations such as streamer tangling. The tangling can be caused by strong water currents in the sea when more than one cable is hooked up and connected. Resolving such tangling scenarios is complex and may expose the seismic crew to hazardous in-sea operations, in addition to being quite costly.

Methods for determining streamer positions have included the use of devices such as Global Positioning System (GPS) receivers, magnetic compasses (also referred to as magnetic heading sensors), acoustic transmitters, conventional streamer hydrophones, or acoustic receivers specifically dedicated to the position-determining task.

U.S. Pat. No. 4,231,111, "Marine Cable Location System", issued to Walter P. Neeley on Oct. 28, 1980, discloses a method for determining streamer positions that distributes magnetic compasses along the streamer cables at regular intervals and employs the heading information from these compasses to model the shape and orientation of each cable. However, the externally-mounted compasses are sometimes lost due to streamer entanglement or other impact situations, and the compasses create flow noise on neighboring seismic sensors. Additionally, the compasses are charged by batteries which need to be replaced at certain intervals and the compasses have to be re-calibrated in the factory after any repairs or changes.

U.S. Pat. No. 5,761,153, "Method of Locating Hydrophones", issued to Vassilis N. Gikas, Paul A. Cross, an Asiama Akuamoa on Jun. 2, 1998, discloses a method for determining streamer positions that employs both magnetic compasses and acoustic transceivers, including both transmitters and receivers. The transmitters and receivers, just as the magnetic compasses, are externally attached to the streamer cables and seismic sources, powered by batteries and communicate via inductive coils located within the streamers. Coded ultrasound signals are transmitted between the transceivers. The transceivers measure distances between transmitters and receivers and enable both the shape of the towed arrays to be determined and the relative positions of the seismic sensors to be estimated. In methods exemplified by Gikas et al. '153, the transmitters and receivers are only placed at the front, center and tail of the streamer spread, due to the high cost of the acoustic transceivers. The magnetic compasses are then used to determine the streamer positions between the transceiver locations. This method still has the problems associated with externally mounted magnetic compasses, as discussed above with respect to Neeley '111.

U.S. Pat. No. 4,992,990, "Method for Determining the Position of Seismic Streamers in a Reflection Seismic Measuring System", issued to Jan-Åge Langeland, Stein ÅSheim, Bjorn Nordmoen, and Erik Vigen on Feb. 2, 1991, discloses a method for determining streamer positions that deploys acoustic transceivers throughout the complete streamer spread. Langeland et al. '990 employs acoustic transceivers positioned on the seismic vessels, tail buoys, a float towed near the front of the streamers, the stretch sections at the front and rear of the streamers, and possibly in the active sections of the streamers. The transceivers operate in the frequency band of 25 to 40 kilohertz (kHz). Starting with two known positions, preferably on the tow vessel and the float, the positions of the other transceivers are determined by trilateration of the transit times (and hence the distances) between the transceivers to form a solvable triangular network. However, employing the seismic acquisition receivers to determiner streamer positions can cause problems when some of the seismic acquisition receivers are unavailable, due to mechanical or electrical failure in the streamers or elsewhere in the tow system. Additionally, this method has the problems associated with externally mounted transceivers, as in Gikas et al. '153 above.

U.S. Pat. No. 4,912,682, "Point Location Determination At or Close to the Surface", issued to John P. Norton, Jr., Michael A. Hall, and Ian N. Court on Mar. 27, 1990, discloses a system in which ultrasonic sonar transmitters are positioned along a streamer, preferably at 300 meter intervals, and seismic receivers are positioned along a streamer, preferably at 100 meter intervals, so that there are three times as many receivers as transmitters. The transmitters emit a unique tone burst or series of tone bursts or a continuously varying tone as in a chirp signal. The signal is transmitted in the 50 to 150 kHz band. The receivers are time-gated to only register the signal during a set time period, to limit the number of receivers apportioned to each transmitter, preferably to seven. The elapsed time for each transmitter-receiver pair is converted to distance by multiplying by the local speed of sound in water, which is assumed constant. The positions of the front of each streamer are presumed known and the positions of the transmitters and receivers are solved sequentially down the streamer lengths by a variation of coordinates technique. In this technique, a set of equations in the additive correction terms is reduced to normal equations by least squares and then solved. From the relative spacing between transmitters and receivers, their relative positions can be determined. However, employing the seismic acquisition receivers to determine streamer positions and attaching the transmitters and receivers externally to the streamer leads to the same problems discussed in Langeland et al. '990, above.

U.S. Pat. No. 6,839,302 B2, "Acoustic Emitters for Use in Marine Seismic Surveying", issued to Peter Austad and Rolf Rustad on Jan. 4, 2005, discloses a method that avoids the drawbacks of externally-mounted equipment by putting the transmitters or receivers in special sections that can be inserted between conventional streamer sections. Austad et al. '302 describes an acoustic emitter that can be inserted between adjacent streamer sections. The emitter comprises an annular housing containing an annular piezoelectric emitting element, which is protected from bending by surrounding flexible barrel stave members. The emitter is adapted to operate in a frequency range up to 10 kHz. However, locating the transmitters in additional insert sections between the streamer sections is expensive and labor intensive.

A problem particular to determining the positions of towed seismic streamers with transmitters and receivers is keeping track of which transmitter's signal is being detected by which receiver at any given time. U.S. Pat. No. 4,187,492, "Device for Determining the Relative Position of Elongate Members Towed behind a Ship", issued to Robert Delignieres and Mareil Marly on Feb. 5, 1980, discloses a method for employing different frequencies for different transmitters. Delignieres et al. '492 describes a system in which acoustic wave transmitters are positioned along a first streamer and acoustic pulse receivers are positioned along a second streamer. Each transmitter transmits at a different frequency and each receiver receives signals from only one transmitter. The system includes a telemetry system for determining travel time intervals of the acoustic pulses between transmitters and receivers and measuring the relative distances from these travel times. The transmitters and receivers primarily comprise a transducer six cylinders of piezoelectric ceramic of six different lengths vibrating in longitudinal mode at six different frequencies. Delignieres et al. '492 gives as an example six frequencies in the range of 20 to 100 kHz. However, employing different frequencies to distinguish the transmitters generally increases the complexity and expense of both the transmitters and the receivers.

U.S. Pat. No. 6,697,300 B1, "Method and Apparatus for Determining the Positioning of Volumetric Sensor Array Lines", issued to Michael D. Holt on Feb. 2, 2004, discloses a method in which each transmitter transmits a distinguishable signal, even though the transmitters and sensors are of identical design, all operating at the same frequency. Holt '300 describes a system which comprises transmitters (including ceramic transducers), sensors (hydrophones) for receiving seismic reflections of the transmitters' signals from objects of interest, and detectors for receiving the transmitters' signals directly. The detectors determine travel times in terms of intervals of clock periods, and hence distances, between the streamers. The transmitters employ code division multiple access type pseudo-random numbers to uniquely identify the signals coming from each transmitter. The signals sent by the transmitters to the streamer-positioning detectors modulate a carrier wave outside the acoustic analysis band of the signals received by the object-positioning sensors, since Holt '300 teaches a system for sonar detection of enemy vessels which must be undetected by the other vessels. In the case of seismic acquisition surveys, this requirement would result in a transmitter carrier wave above the seismic acquisition band. These higher frequency signals suffer from higher attenuation, thus degrading the resolution required for positioning long streamer arrays.

U.S. Pat. No. 5,668,775, "Methods for Determining the Position of Seismic Equipment, and Applications of the Methods", issued to Kjell Hatteland on Sep. 6, 1997, discloses a method employing acoustic transmitters between streamer section segments and conventional seismic receivers (hydrophones) located inside the streamers. Both power and communication to these transmitters go through the streamer harness. The transmitters operate at low frequencies, in the approximate range of 1 Hertz (Hz) to 1 kHz, encompassing the seismic frequency range. The transmitters generate a spread spectrum signal as an orthogonally encoded signal sequence with an unambiguous top in the form of a prominent peak in the signal's autocorrelation function. Cross-correlating the signal received by a receiver with the orthogonally encoded signal sequence of the transmitted spread spectrum signal allows the determination of a time difference between the detection of the signal by different receivers. This time difference, in turn, allows the determination of the distance between individual transmitters and receivers, based on a known in-line distance between receivers. A high number of transmitter-receiver combinations are used to determine a network which then gives the seismic equipment's geometrical configuration. However, in Hatteland 3 775, the seismic receivers are employed both for determining streamer positions as well as conventional seismic acquisition, instead of employing separate systems of dedicated receivers, leading to the same problems discussed above in Norton, Jr. et al. '682 and Langeland et al. '990.

The previously described methods for determining the positions of streamers contain a number of problems. In systems employing magnetic compasses, as in Neeley '111 and Gikas et al. '153, compass headings are referred to magnetic north, and knowledge about the local magnetic variation (declination) is necessary. The effect of magnetic storms and local anomalies can only partly be corrected for. Due to the sparse sampling along the cable and lack of information about how the streamer behaves between the compass locations, the positioning accuracy is not precise. This lack of precision is especially important when lateral steering devices used to control the cross-line position of the streamer cables are placed between the compass positions. Because compass readings are influenced by wave motion caused by weather conditions, the compass readings are filtered over time, with the result that the values used in the computations of streamer positions have a significant time lag.

Employing externally-mounted transceivers, either transmitters or receivers, as in Gikas et al. '153, Langeland et al. '990, and Norton, Jr. et al. '682, has several drawbacks. During streamer deployment and retrieval modes, attaching and removing the transceivers so that the streamers can be spooled directly on and off winches onboard the survey vessel requires considerable operational time, which is very expensive. Externally-attaching the transceivers (or any other equipment, such as magnetic compasses) to the streamer cables increases tow drag on the streamer and increases the noise in the detected seismic signals. The transceivers are also exposed to impact and thus transceivers are lost from time to time. In addition, the batteries have to be replaced at regular intervals. Because of the high frequencies used for the acoustic ranging, the performance may be degraded in hostile acoustic environments.

Locating transmitters or receivers in dedicated streamer inserts; between streamer sections, as in Austad et al. '302, is expensive and labor intensive. Additionally, both data redundancy and quality may be limited because of the limitation on spacing of the transceivers.

Employing transmitters designed to transmit at different frequencies, as in Delignieres et al. '492, may increase the cost of both the transmitters and receivers. Employing transmitters designed to transmit at higher frequencies, as in Holt '300, leads to signals which attenuate too rapidly over longer distances. This attenuation reduces the resolution at the longer distances employed in positioning long streamer arrays than in the shorter streamer arrays employed in detecting vessels, as in Holt '300.

Employing the seismic data acquisition receivers, instead of separate dedicated receivers, to determine steamer positions, as in Langeland et al. '990, Norton, Jr. et al. '682, and Hatteland '775, leads to problems. The acoustic position-determining network may be significantly degraded if the seismic acquisition receivers are not available on some streamers. Receiver unavailability may occur during streamer failure, maintenance or system testing.

Finally, the inability to make inline distance measurements, as in Norton et al. '682, leads to lack of precise knowledge of the distance between the transmitters and receivers when the streamer is under tow, which in turn, leads to lack of accurate knowledge of the amount of stretching of the streamer under tension. This lack of knowledge degrades the streamer position-determining accuracy.

Thus, a need exists for an improved method for determining positions of towed marine seismic streamers.

BRIEF SUMMARY OF THE INVENTION

The invention is, in one embodiment, a system for determining positions of towed marine seismic streamers. The system comprises a plurality of acoustic transmitters, mounted inside the streamers, adapted to transmit broadband signals having low cross-correlation between the signals of different transmitters; a plurality of acoustic receivers, mounted inside the streamers, adapted to receive the signals from the transmitters; at least one processor adapted to cross-correlate the signals received at the receivers with copies of transmitter signals to determine identities of the transmitters of the received signals and to determine travel times of the received signals; and a main processor adapted to convert the travel times to distances between the identified transmitters and the receivers and to determine relative positions of the streamers from the distances.

The invention is, in another embodiment, a method for determining positions of towed marine seismic streamers, comprising: towing a plurality of transducers adapted to be acoustic transmitters inside the streamers, wherein the transmitters are adapted to transmit broadband signals having low cross-correlation between the signals of different transmitters; towing a plurality of transducers adapted to be acoustic receivers inside the streamers, wherein the receivers are adapted to receive the signals of the transmitters, cross-correlating the received signals with copies of transmitter signals to determine identities of transmitters of the received signals and travel times of the received signals, in at least one processor; converting the travel times to distances between the identified transmitters and the receivers; and determining the relative positions of the streamers from the distances.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a system and method for determining the positions of data acquisition equipment, in particular the seismic sensors used in multiple streamer cables used in marine seismic surveys for imaging the subterranean formations. The system comprises a series of acoustic transmitters and receivers, dedicated to the task of determining streamer positions, distributed along the length of the streamers. The transmitters and receivers are incorporated along with corresponding power and control electronics into the streamer. In a preferred embodiment, the system for determining streamer positions of the invention is designed as a stand-alone system with separate power supply and communication telemetry links to the survey vessel.

Acoustic signals from the transmitters located within a section of a streamer cable are detected by a plurality of dedicated receivers located within other sections. The receivers can be located in sections both within the same streamer as the transmitter for inline ranging and within other streamers for volumetric determination. Processing the acquired signals yields the propagation times between combinations of transmitters and receivers and hence the distances between these transmitter and receiver combinations. These distances can then be used, in turn, to calculate the relative positions of the transmitters and receivers in the streamers.

Figure 1A:
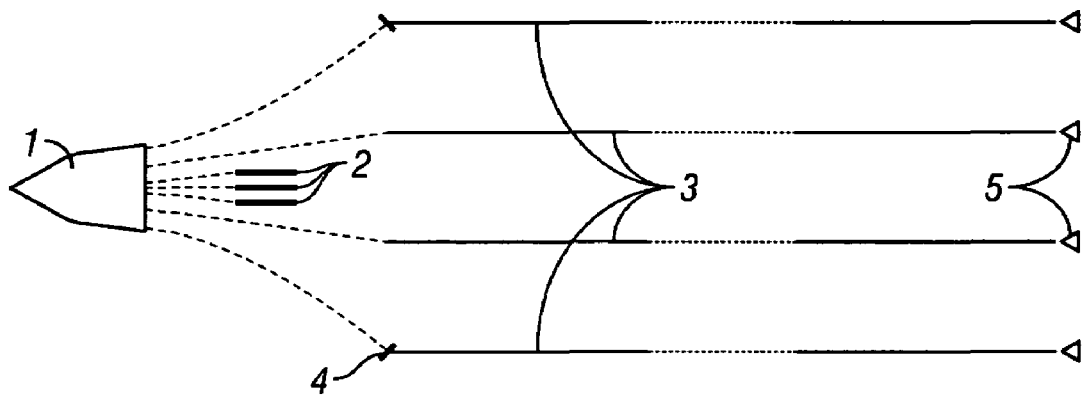
FIG. 1A is a top schematic view of an ideal case, with no cross-currents, of a 3D marine seismic survey using towed streamers.
Figure 1B:
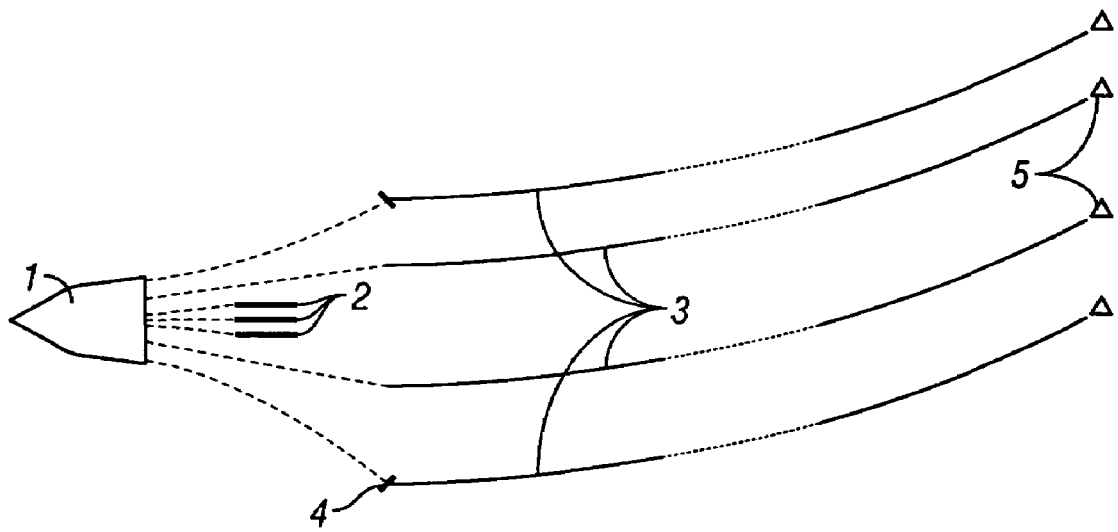
FIG. 1B is a top schematic view of a more realistic case, with cross-currents, of a 3D marine seismic survey using towed streamers.
Figure 2:
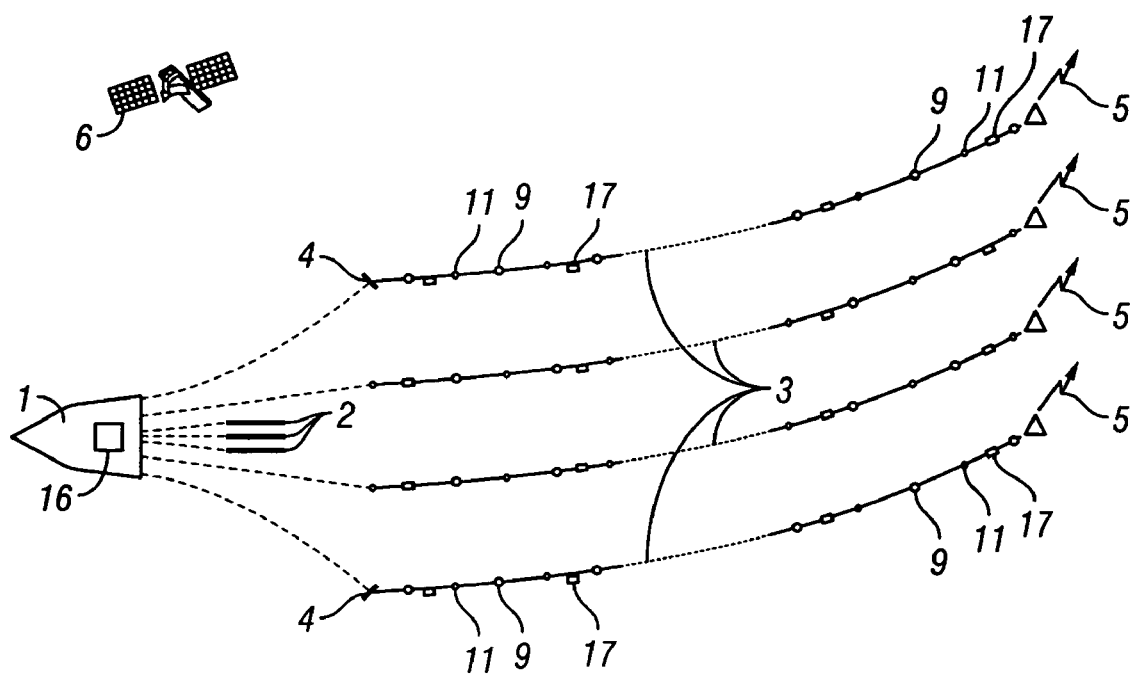
FIG. 2 is a top schematic view of a system for determining positions of towed seismic marine streamers, according to an embodiment of the invention.

FIG. 2 illustrates a top schematic view of a system for determining positions of towed marine seismic streamers, according to an embodiment of the invention. As in FIG. 1, above, a seismic survey vessel 1 tows an illustrative seismic tow system which comprises an active source consisting of three air gun arrays 2, and a spread of four streamer cables 3. The streamer cables 3 extend from streamer separation doors (deflectors) 4 at the front of the spread to tail buoys 5 at the rear. GPS receivers located on the vessel 1, on streamer separation doors 4 and on tail buoys 5, receive signals from navigation satellites 6 in space and provide accurate absolute positions of front and tail reference points.

The streamer position-determining system further comprises a number of acoustic transmitters 9 and receivers 11 mounted inside the sections (not designated here) of the streamers 3. The transmitters 9 and receivers 11 communicate with a main processor 16 via an electrical bundle (shown in FIG. 3 as 14) within the streamers 3. The main processor 16 is typically located onboard the survey vessel 1, although this location should not be considered a limitation of the invention. A transmitter 9 and a receiver 11 may be combined in one transducer unit, although this combination should not be considered a limitation of the invention. If the transmitter 9 and receiver 11 are combined into one transducer unit, then this transducer unit can act as either a transmitter 9 or a receiver 11 or even both (although not simultaneously).

In a preferred embodiment of the invention, the acoustic system for determining streamer positions transmits signals within the frequency range of 10 kHz to 40 kHz. This frequency band is selected to avoid signal degradation in hostile acoustic environments that occurs when higher ultrasonic frequencies are utilized and the decreased signal resolution that occurs when lower frequencies are utilized. The transmitters 9 transmit an acoustic signal in the water and the receivers 11 receive these transmitted signals. Several transmitters 9 may transmit at the same time, but different transmitters 9 transmit different signals. The different signals from different transmitters have low cross correlation, so that a receiver 11 can distinguish between different transmitter signals even if the signals arrive simultaneously.

One method for generating a signal with a wide bandwidth and with the flexibility to generate a number of different transmitter waveforms with low cross-correlation is to use pseudo random noise codes. Two examples of pseudo random noise sequences that are appropriate for the invention are the Gold sequence and the Kasami sequence. Direct sequence spread spectrum techniques can be used to modulate a single carrier frequency with these pseudo random noise sequences to generate a spread signal. Two different modulation techniques can be applied. In the first technique, the pseudo random noise sequence directly modulates the carrier frequency and accomplishes the full band spread. In the second technique, linearly swept chirps represent the states of the pseudo random noise sequence and the band spread lies mainly in the chirps. This second modulation technique can use smaller pseudo random noise sequences to generate different transmitter waveforms with reasonably small cross-correlations. Such an approach may yield better correlation results than using modulation functions with zero cross-correlation, as in Hatteland '775, discussed above.

The transmitters 9 and receivers 11 are time synchronized from the main processor 16, which transmits a time synchronization signal received by all the transmitters 9 and receivers 11. Each transmitter 9 transmits a unique acoustic signal, according to a pre-set triggering schedule of transmissions for that transmitter 9. At least one receiver 11 detects the transmitted signal during a pre-set schedule of listening time windows for that receiver 11. The propagation time between the transmitter 9 and the receiver 11 is estimated based on the time difference between the known triggering time of the transmitter 9 and the calculated arrival time at the receiver 11 of the transmitted signal from the transmitter 9. The range between transmitter 9 and the receiver 11 can then be calculated, based on knowledge of the sound velocity in the water. The receiver 11 can listen for acoustic signals from several transmitters 9 at the same time and hence determine the range to several transmitters 9 in the system simultaneously.

In one embodiment, the speed of sound in the water is measured by sound velocity sensors 17 located along the streamers 3. Sound velocity sensors 17, well known in the art, typically measure the speed of sound in water directly, typically by an acoustic time of flight measurement, or calculate the speed of sound in water indirectly from other sensor-measured parameters, typically conductivity (to determine salinity), temperature, and depth (to determine pressure). In other embodiments, however, the velocity sensors 17 can be located elsewhere, such as, for example, in separate modules inserted between the streamer sections 15, in towing apparatus at the front of the streamers 3, in steering apparatus along the streamers 3, or in tail buoys at the rear of the streamers 3. Moreover, the use of velocity sensors 17 is not meant to be a limitation of the invention, as the speed of sound in the water may be determined by other means known in the art.

The system as presented in FIG. 2 can be utilized for inline ranging along the length of a streamer 3, which, for example, can provide a measurement of the amount of stretch in a streamer 3 due to the tension of being towed. The acoustic signal from a transmitter 9 is detected by one or more receivers 11 located within the same streamer 3. The distance between a transmitter 9 and a receiver 11 is computed using the estimated propagation time of the signal and the speed of sound in the water. As before, the speed of sound in the water may be measured using velocity sensors 17 located along the streamers 3 or by any other means known in the art.

Figure 3:
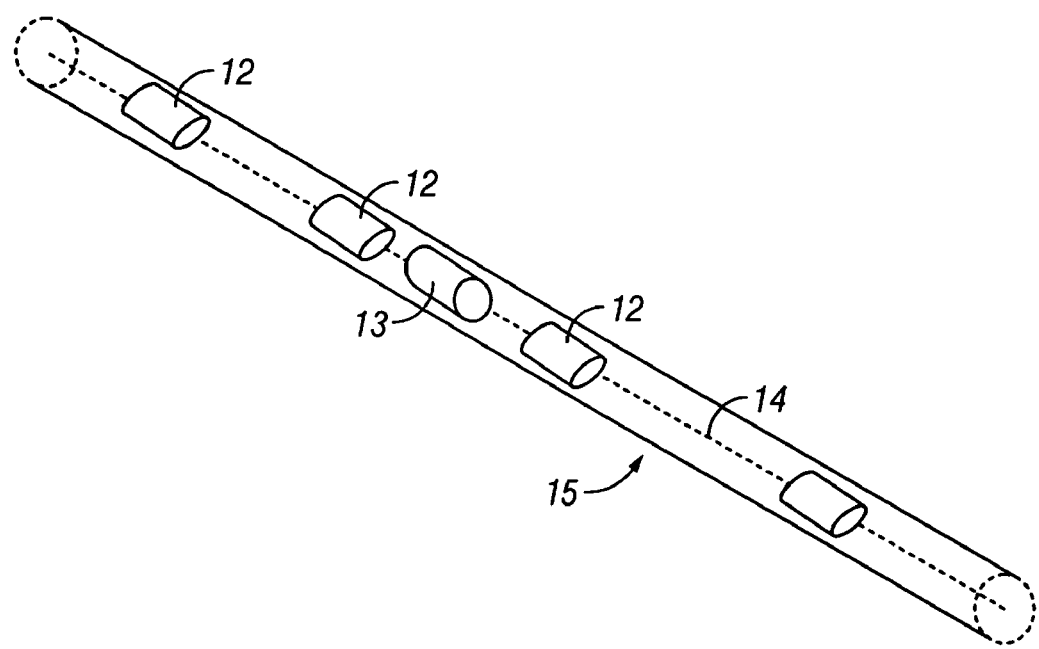
FIG. 3 is a perspective schematic view of a portion of a streamer section with seismic acquisition receivers, according to an embodiment of the invention.

FIG. 3 illustrates a perspective schematic view of a portion of a streamer section with seismic acquisition receivers, according to an embodiment of the invention. The portion of the streamer section 15 shown contains seismic acquisition receivers 12, which will typically be pressure sensitive sensors, such as hydrophones. The seismic acquisition receivers 12 are distributed at known positions along the streamer sections 15. A series of seismic acquisition receivers 12 may be connected together to give a group output signal or the signals from each of the seismic acquisition receivers 12 may be recorded individually. The seismic acquisition receivers 12 are connected via an electrical bundle 14 to receiver processors 13, which, along with the seismic acquisition receivers 12, are connected via the electrical bundle 14 to the main processor 16 (shown in FIG. 2). The receiver processors 13 are electronics modules that perform many tasks well known in the art, such as the conversion of analog seismic signals to digital format. Although the receiver processors 13 are illustrated in FIG. 3 as built into the streamer section 15, this location is not intended to be a limitation of the invention. For example, the receiver processors 13 could be located in separate modules (not shown) inserted between the streamer sections 15.

Figure 4:
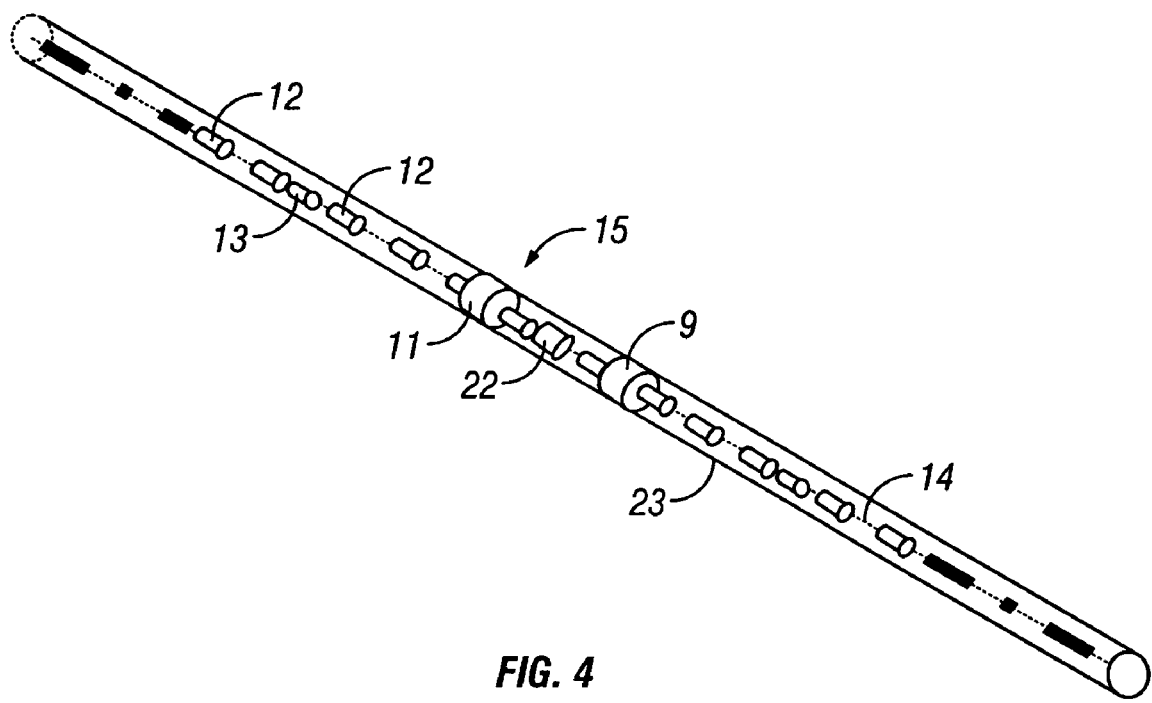
FIG. 4 is a perspective schematic view of a streamer section with streamer position-determining transmitters and receivers, according to an embodiment of the invention.

FIG. 4 is a perspective schematic view of a streamer section with streamer position-determining transmitters and receivers, according to an embodiment of the invention. The transmitter 9, introduced in FIG. 2, and a transmitter processor 22 are mounted inside the skin 23 of the streamer section 15 and use wires in the electrical bundle 14 in the streamer section 15 for receiving power and for communication with the main processor 16 (FIG. 2). The transmitter processor 22 is an electronics module which typically comprises a signal generator and a driver stage (neither shown separately). The transmitter processor 22, and hence the transmitter 9, is re-programmable by the main processor 16, via the electrical bundle 14. The transmitter processor 22 receives a time synchronization signal and a triggering schedule from the main processor 16. The transmitter processor 22 utilizes the triggering schedule to tell the transmitter 9 when to transmit signals to the receivers 11, relative to the time synchronization signal from the main processor 16.

In a preferred embodiment of the invention, the receivers 11, introduced in FIG. 2, are dedicated to determining the position of the seismic streamer 3, and are separate from seismic acquisition receivers 12, introduced in FIG. 3, for detecting seismic survey signals. In this embodiment, the receivers 11 will then be referred to as position-determining receivers 11, to distinguish them from the seismic acquisition receivers 12.

The position-determining receiver 11 and the receiver processor 13, introduced in FIG. 3, are mounted inside the skin 23 of the streamer section 15 and utilize wires in the electrical bundle 14 in the streamer section 15 for receiving power and for communication with the main processor 16. The receiver processor 13, and hence the position-determining receiver 11, is re-programmable by the main processor 16, via the electrical bundle 14. The receiver processor 13 receives a time synchronization signal and a set of time windows from the main processor 16. The receiver processor 13 utilizes the time window to tell the position-determining receiver 11 when to receive signals from the transmitters 9, relative to the time synchronization signal from the main processor 16.

The transmitter processor 22 communicates via the electrical bundle 14 with the main processor 16 (FIG. 2) and receives the time synchronization signals and the pre-set triggering schedule from the main processor 16. The transmitter processor 22 utilizes the triggering schedule to determine when a transmitter 9 should transmit signals, relative to the reception time of the time synchronization signals received from the main processor 16. At the determined time, the signal generator in the transmitter processor 22 generates the transmit signal, which is then amplified in the driver stage in the transmitter processor 22. Finally, the transmitter processor 22 sends the amplified transmit signal via the electrical bundle 14 to the transmitter 9 for transmission to the position-determining receivers 11.

When one of the position-determining receivers 11 receives the transmitted acoustic signal from one of the transmitters 9, the received signal is sent via the electrical bundle 14 to the receiver processor 13 associated with the receiver 11. The receiver processor 13 typically applies preliminary signal conditioning to the received signal before further processing. This signal conditioning may include, but is not limited to, pre-amplifying, filtering, and digitizing. The digitizing is only applied to that portion of the received signal that arrives at the position-determining receiver 11 during one of its pre-set time windows, thus limiting the received signals to the time windows. Thus, the transmitted signals are only transmitted according to triggering schedules for each transmitter 9 and only received during time windows for each position-determining receiver 11, all coordinated and time synchronized by the main processor 16.

A time window for listening for signals at a particular position-determining receiver 11 corresponds to a travel distance range for a signal transmitted between a transmitter 9 and that particular position-determining receiver 11. Thus, this coordination of triggering schedules and time windows by the main processor 16 controls which position-determining receivers 11 receive signals from which transmitters 9. In particular, this coordination limits the possible transmitters 9 that each of the position-determining receivers 11 can receive signals from. Indeed, each of the position-determining receivers 11 can be limited to receiving signals from only one possible transmitter 9. Further, the possible transmitter or transmitters 9 that a particular position-determining receiver 11 can receive signals from, can change in time under the control of the main processor 16.

The digitized received signal is further processed by the receiver processor 13 associated with the position-determining receiver 11. The receiver processor 13 confirms reception of the received signal at the position-determining receiver 11 from a particular transmitter 9. This confirmation of transmission of the received signal from the transmitter 9 is accomplished in the present invention by cross-correlation of the received signal from the position-determining receiver 11 with copies (replicas) of the transmitted signal from the possible transmitters 9. In addition, the receiver processor 13 determines the arrival time of the received signal at the position-determining receiver 11. This arrival time determination is also accomplished in the present invention by the same cross-correlation of received signal with a transmitted signal copy. Further, before continuing, another possible source of signal degradation is compensated for. Since the relative distance between a transmitter 9 and a position-determining receiver 11 varies, the received signal may be shifted, either compressed or expanded, relative to the transmitted signal, due to Doppler effects. Thus, the receiver processor 13 has to determine the appropriate Doppler shift that compensates for these Doppler effects before further processing of the received signal can be undertaken. This determination of Doppler shift is again accomplished in the present invention by the same cross-correlation of received signal with transmitted signal copy, as before. Thus, these cross-correlations need only be calculated once for each possible combination of received signal, transmitted signal copy, and Doppler shift, to determine the appropriate Doppler compensation for the received signal, the identity of the transmitter 9 of the received signal, and the arrival time of the received signal. This computational parsimony yields increased efficiency for the method of the present invention.

Once the receiver processor 13 confirms the transmission of the received signal from a particular transmitter 9 to the position-determining receiver 11, the receiver processor 13 employs the triggering schedule of that transmitter 9 to acquire the transmission time for the received signal. Then, the receiver processor 13 can calculate the difference between the transmission and arrival times of the received signal. This time difference yields the travel time between this particular pair of transmitter 9 and position-determining receiver 11 at this particular time. With knowledge of this travel time and the current speed of sound in the water, the distance between the transmitter 9 and the position-determining receiver 11 may be calculated. Typically, this calculation is performed in the main processor 16, although this assignment is not intended to be a limitation on the invention. Thus, the travel time is sent via the electrical bundle 14 from the receiver processor 13 to the main processor 16.

In a preferred embodiment, the receiver processor 13 performs the cross-correlations of the received signal with copies of possible transmitter 9 signals in an iterative scheme. For a particular received signal at a particular position-determining receiver 11, the receiver processor 13 determines a set of possible transmitters 9 that could be the source of that received signal. This determination may be accomplished, for example, by comparing the triggering schedules of the transmitters 9 with the time window of the position-determining receiver 11 during which the received signal arrived. This comparison may be done by either the receiver processor 13 after receiving the necessary information (triggering schedules and time windows) from the main processor 16 or by the main processor 16 before sending the result (possible transmitters 9) to the receiver process 13.

The iterative scheme begins by iteratively checking each of the set of possible transmitters 9 determined above. The receiver processor 13 selects one transmitter 9 from the set of possible transmitters 9. The receiver processor 13 supplies a copy of the unique transmitted signal for the transmitter 9 that the receiver processor 13 is looking at. In one embodiment, copies of the different transmitter signals are stored in the receiver processor 13. In another embodiment, the copies of the transmitter signals are generated by the receiver processor 13. The invention is not limited to these two particular embodiments, as other methods known in the art could be employed.

Next, the receiver processor 13 determines a set of possible Doppler shifts to compensate the received signal for the Doppler effects that might be anticipated due to survey conditions, such as the size and direction of currents in the vicinity of the transmitter 9 and position-determining receiver 11 being investigated. Doppler compensation is accomplished by removing data samples from or adding data samples to the received signal, according to whether the received signal is being compressed or expanded, respectively, by Doppler effects. The iterative scheme of the invention will then iteratively check each of this set of possible Doppler shifts. The receiver processor 13 selects one Doppler shift from this set of possible Doppler shifts and applies this Doppler shift to the received signal.

The receiver processor 13 calculates the cross-correlation of the Doppler-compensated received signal with the copy of the transmitted signal for the transmitter 9 being checked. The receiver processor 13 calculates the envelope of the cross-correlation and then determines the first peak in the correlation envelope to have a sufficient correlation signal to correlation noise ratio to be significantly detectable above the correlation noise. The receiver processor 13 may apply a peak detection algorithm to determine the first peak or apply any other method well known in the art. The receiver processor 13 calculates the correlation signal to correlation noise ratio of and time for this detected correlation peak and saves both peak correlation signal to correlation noise ratio and peak time in memory for later retrieval. The term correlation signal to correlation noise ratio will be used here to mean the ratio of the signal in the correlation envelope to the noise in the correlation envelope, as measured at the first detectable peak in the correlation envelope.

The iterative scheme of the invention checks each of the remaining Doppler shifts in the set of possible Doppler shifts. The receiver processor 13 repeats the cross-correlations described above for all of the possible Doppler shifts. The Doppler shift that yields the best of the saved correlation peak signal-to-noise ratios for the received signal is designated as the Doppler shift compensation for that particular transmitter 9 and position-determining receiver 11 combination. The saved peak time of the detected correlation peak for the designated Doppler compensation will be designated as the estimated arrival time for the received signal from that transmitter 9.

The iterative scheme of the invention checks each of the remaining transmitters 9 in the set of possible transmitters 9. The receiver processor 13 repeats the above steps for finding the Doppler compensation and estimated arrival time, described in the previous paragraph, for all possible transmitters 9. The transmitted signals from different transmitters 9 are designed in the invention with low cross-correlations. Thus, the calculated cross-correlations of the received signal with the copies of the transmitted signals from different transmitters 9 should be low for all transmitters 9 except the actual transmitter 9 of the received signal. The first location of a correlation peak with sufficient correlation signal to correlation noise ratio to be significantly detectable within the time window of the position-determining receiver 11 is used to determine the arrival time of the received signal from the source transmitter 9.

The receiver processors 13 repeat the above-described iterative scheme of the invention for all received signals and their corresponding position-determining receivers 11 to identify the source transmitters 9 of, and estimate the arrival times for, all received signals at all position-determining receivers 11.

Then, the receiver processors 13 can determine travel times between the pairs of transmitters 9 and position-determining receivers 11 determined by the previously-described iterative cross-correlation scheme. The receiver processor 13 calculates the time difference between the start time and the arrival time of the corresponding received signal. The receiver processor 13 knows the start time of the received signal from the triggering schedule for the source transmitter 9, as confirmed by the cross-correlation results. The receiver processor 13 knows the arrival time of the received signal from the detected first correlation peak of the received signal, as determined from the cross-correlation results. The receiver processors 13 repeat this calculation for all received signals to yield the travel times between pairs of transmitters 9 and position-determining receivers 11.

The receiver processors 13 send the travel times to the main processor 16. Alternatively, the travel times may be measured and sent as numbers of clock periods instead of actual time. Temperature-compensated quartz crystal oscillators could be used as clocks in the receiver processors 13 to give sufficient accuracy and stability along with minimal size and power consumption. The main processor 16 utilizes these travel times, multiplied by the local sound velocity in the water, to calculate the travel distances between the transmitters 9 and the position-determining receivers 11. The local sound velocity in water may be estimated, measured by sound velocity sensors located along the seismic streamers, or obtained by any other means known in the art.

The main processor 16 combines the travel distances between the pairs of transmitters 9 and position-determining receivers 11 into a trilateration network representation of the transmitters 9 and position-determining receivers 11 in the towed marine seismic streamers 3. A trilateration network is a two-dimensional model using triangular-shaped elements to represent the known relative distances between the unknown transmitter 9 and position-determining receiver 11 positions (nodes). Standard mathematical techniques are known in the art for solving for the nodes in a trilateration network. Thus, the main processor 16 can determine the relative positions of the towed marine seismic streamers 3 from the calculated positions of the transmitters 9 and position-determining receivers 11 on the streamers 3.

FIGS. 5A, 5B, 5C, and 5D show a series of flowcharts illustrating the steps of an embodiment of the method of the invention for determining the relative positions of towed marine seismic streamers. The invention is illustrated by an embodiment in which the processing units comprise a network with a main. processor located onboard the seismic survey vessel and a plurality of distributed receiver processors located within the seismic streamers. However, the processor units can be distributed throughout any type of network at any appropriate location or combination of locations, including, but not limited to, the seismic survey vessel, other vessels, the towed streamers, and any other part of the tow system. The number, types, location, or relationship of the members of the processing network is not a limitation of the invention.

Figure 5A:
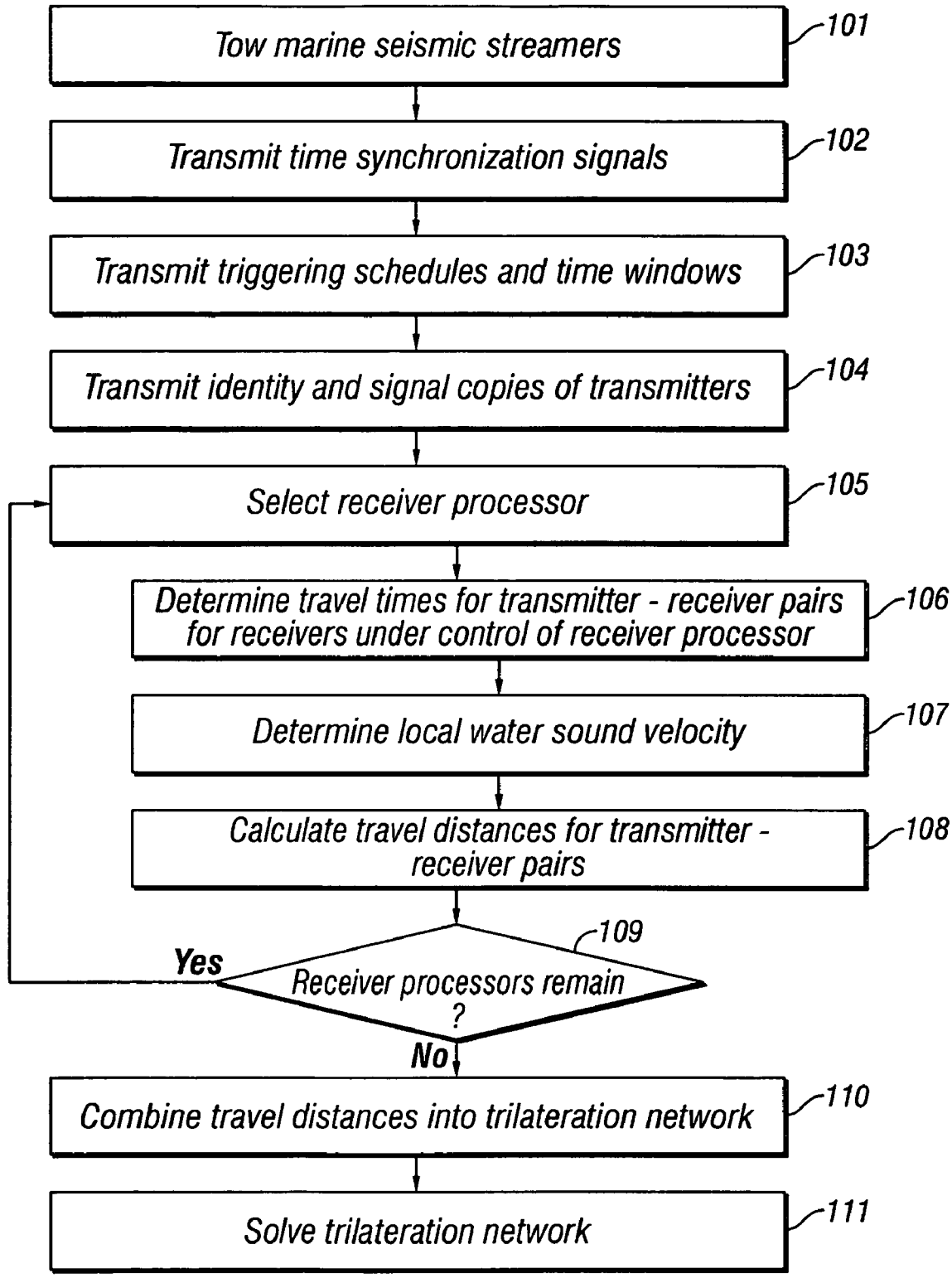
FIG. 5A is a flowchart illustrating the processing steps of a main processor for an embodiment of the method of the invention for determining the relative positions of towed marine seismic streamers.

FIG. 5A is a flowchart illustrating the processing steps of a main processor for an embodiment of the method of the invention for determining the relative positions of towed marine seismic streamers.

At step 101, a plurality of marine seismic streamers are towed, typically by a seismic survey vessel. A plurality of transmitters and a plurality of receivers are mounted within streamer sections in the towed marine seismic streamers. A main processor is located on board the survey vessel. Transmitter processors and receiver processors are mounted within the streamer sections in the towed marine seismic streamers. The plurality of transmitters comprise acoustic transducers dedicated to the task of determining the positions of the streamers. The plurality of receivers comprise two sets of receivers. The first set of receivers comprise conventional seismic receivers dedicated to the task of acquiring seismic data. These seismic acquisition receivers are typically pressure sensors, such as hydrophones, but could also include particle motion sensors, such as geophones or accelerometers, or any other seismic detectors known in the art. The second set of receivers comprise acoustic transducers dedicated to the task of determining the positions of the streamers.

At step 102, the main processor transmits time synchronization signals to all of the transmitter processors and receiver processors of step 101.

At step 103, the main processor transmits triggering schedules for each transmitter to the transmitter processors of step 101 controlling those transmitters and to those receiver processors of step 101 that control position-determining receivers that might receive signals from these transmitters. The main processor also transmits sets of time windows for each position-determining receiver to the receiver processors of step 101 controlling those receivers.

At step 104, the main processor sends the identity of and a copy of the transmitted signal used by that transmitter to the receiver processors of step 101.

At step 105, the main processor selects a receiver processor from the plurality of receiver processors of step 101. Alternatively, the receiver processors may initiate the following steps under their own control, rather than under the control of the main processor. The source of control of the receiver processors is not a limitation of the invention. This step is a formal procedure for considering all the receiver processors and their processing results in a systematic fashion, for illustrative purposes only.

At step 106, the main processor determines travel times for received signals transmitted from (source) transmitters to the position-determining receivers under the control of the receiver processor selected in step 105. In the embodiment being illustrated, the main processor receives these travel times for received signals between transmitter—receiver pairs from the selected receiver processor, where the travel times are calculated.

Figure 5B:
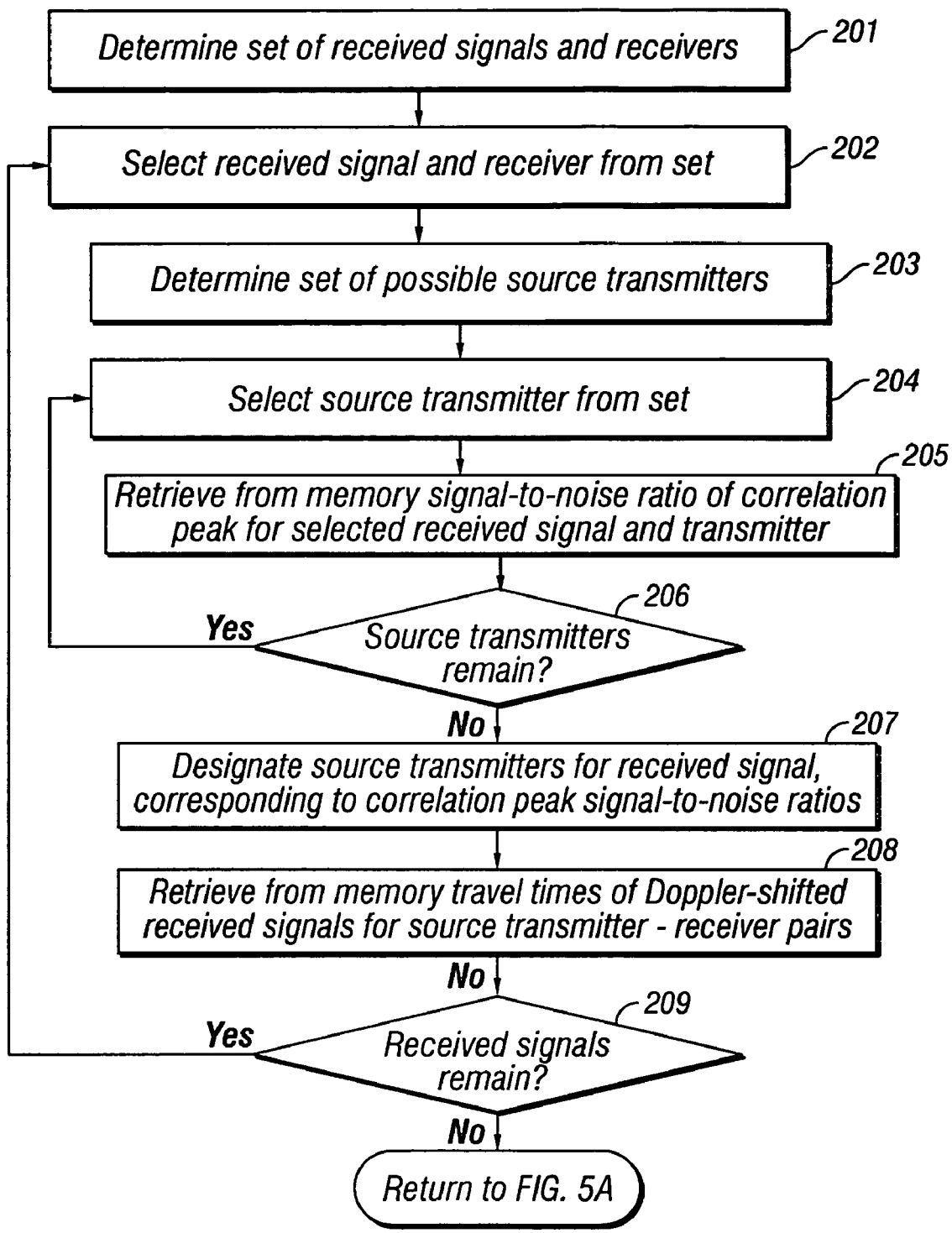
FIG. 5B is a flowchart illustrating the processing steps of a selected receiver processor for an embodiment of the method of the invention for determining travel times of received signals transmitted by transmitters to the position-determining receivers under the control of the selected receiver processor.

In the embodiment being illustrated, this calculation of the travel times is illustrated in the processing that is performed in the flowchart in FIG. 5B. That is, the process goes to the beginning, step 201, of FIG. 5B with the identity of the selected receiver processor and then returns here to step 106 from the end, step 209, of FIG. 5B with the calculated travel times for received signals between transmitter—receiver pairs for all receivers under the control of the selected receiver processor. In particular, the process returns with the identity of the source transmitters designated in step 207, the corresponding travel times retrieved in step 208, and the corresponding position-determining receiver determined in step 201, for each received signal selected in step 202 of FIG. 5B.

At step 107, the main processor determines the local sound velocity in the water in the vicinity of the pairs of source transmitters and position-determining receivers corresponding to the received signals, as determined in step 106.

At step 108, the main processor calculates the travel distances between the pairs of source transmitters and position-determining receivers corresponding to the received signals, as determined in step 106. The main processor calculates the travel distances by multiplying the travel times of the received signals, as determined in step 106, by the local sound velocity in water determined in step 107.

At step 109, the main processor determines if there are any remaining receiver processors left to check from the plurality of receiver processors in step 101. If the answer is yes, there are receiver processors left to check, then the process returns to step 105. If the answer is no, there are no receiver processors left to check, then the process continues to step 110.

At step 110, the main processor combines the travel distances calculated in step 108 between pairs of transmitters and position-determining receivers to construct a trilateration network representation of the distances between all the pairs of transmitters and position-determining receivers in the towed marine seismic streamers.

At step 111, the main processor solves the trilateration network constructed in step 110 to obtain the relative positions of the transmitters and the position-determining receivers in the towed marine seismic streamers. Standard mathematical techniques are known in the art for solving a trilateration network. The positions of the transmitters and the position-determining receivers, if sufficiently distributed along the streamers, yields the shape and relative positions of the towed marine seismic streamers.

Thus, in the flowchart in FIG. 5A, the main processor determines the travel times of all received signals transmitted from the transmitters to the position-determining receivers and utilizes these travel times to determine the relative positions of the towed marine seismic streamers. The next flowchart in FIG. 5B shows a portion of the iteration scheme that each receiver processor employs to determine the travel times for the received signals at the position-determining receivers under its control.

FIG. 5B is a flowchart illustrating the processing steps of a selected receiver processor for an embodiment of the method of the invention for determining travel times of received signals transmitted by transmitters to the position-determining receivers under the control of the selected receiver processor.

At step 201, the receiver processor selected by the main processor in step 105 of FIG. 5A determines a set of received signals for each of the position-determining receivers under the control of the selected receiver processor. The received signals are those signals transmitted by the position-determining transmitters and received by the position determining receivers. Typically, the position-determining receiver controlled by the receiver processor will be located in the same streamer section as the receiver processor, but this location is not intended to be a limitation of the invention.

At step 202, the receiver processor selects a received signal and the corresponding position-determining receiver that received the received signal from the set of received signals and corresponding position-determining receivers determined in step 201.

At step 203, the receiver processor determines a set of possible source transmitters for the received signal received at the corresponding position-determining receiver selected in step 202. The receiver processor determines the set of possible source transmitters for the received signal by comparison of the triggering schedules for the transmitters and the currently-investigated time window for the corresponding position-determining receiver, transmitted from the main processor in step 103 of FIG. 5A.

At step 204, the receiver processor selects a transmitter from the set of possible source transmitters for the received signal, as determined in step 203.

At step 205, the receiver processor retrieves from memory the correlation signal to correlation noise ratio of the correlation peak for the received signal selected in step 202 for the transmitter selected in step 204. In the embodiment being illustrated, this correlation signal to correlation noise ratio is obtained from the processing that is performed in the flowchart in FIG. 5C. That is, the process goes to the beginning, step 301, of FIG. 5C with the identity of the selected received signal and selected possible source transmitter, and then returns here from the end, step 306, of FIG. 5C with the retrieved correlation signal to correlation noise ratios. In particular, the correlation signal to correlation noise ratio of the correlation peak corresponding to the Doppler shift for the selected received signal from the selected transmitter is saved in memory in step 306 of FIG. 5C.

At step 206, the receiver processor determines if there are any remaining transmitters left to check from the set of possible transmitter sources determined in step 203. If the answer is yes, there are transmitters left to check, then the process returns to step 204. If the answer is no, there are no transmitters left to check, then the process continues to step 207.

At step 207, the receiver processor determines which selected transmitter corresponds to each of the correlation signal to correlation noise ratios of the correlation peaks retrieved in step 205 and designates each of these selected transmitters as source transmitters for the received signal selected in step 202.

At step 208, the receiver processor retrieves from memory the corresponding travel times of the Doppler-shifted received signals between the source transmitters designated in step 207 and the corresponding position-determining receiver selected in step 202. These travel times are all designated as possible travel times of the received signal selected in step 202. In the embodiment being illustrated, these travel times are obtained from the processing that is performed in the flowchart in FIG. 5D. In particular, the corresponding travel times of the Doppler-shifted received signals for the source transmitters are saved in memory in step 410 of FIG. 5D.

At step 209, the receiver processor determines if there are any remaining received signals and corresponding position-determining receivers left to check from the set of received signals and corresponding position-determining receivers in step 201. If the answer is yes, there are received signals and corresponding position-determining receivers left to check, then the process returns to step 202. If the answer is no, there are no received signals and corresponding position-determining receivers left to check, then the process returns to step 106 of FIG. 5A. The process returns with the identity of the source transmitters designated in step 207, the corresponding travel times retrieved in step 208, and the corresponding position-determining receiver determined in step 201, for each received signal selected in step 202.

Thus, in the flowchart in FIG. 5B, the receiver processor determines the identities of all possible source transmitters and the corresponding travel times for all received signals received by all position-determining receivers under the control of one selected receiver processor. The next flowchart in FIG. 5C shows a remaining portion of the iteration scheme that each receiver processor employs to determine the travel times for the received signals at its position-determining receivers.

Figure 5C:
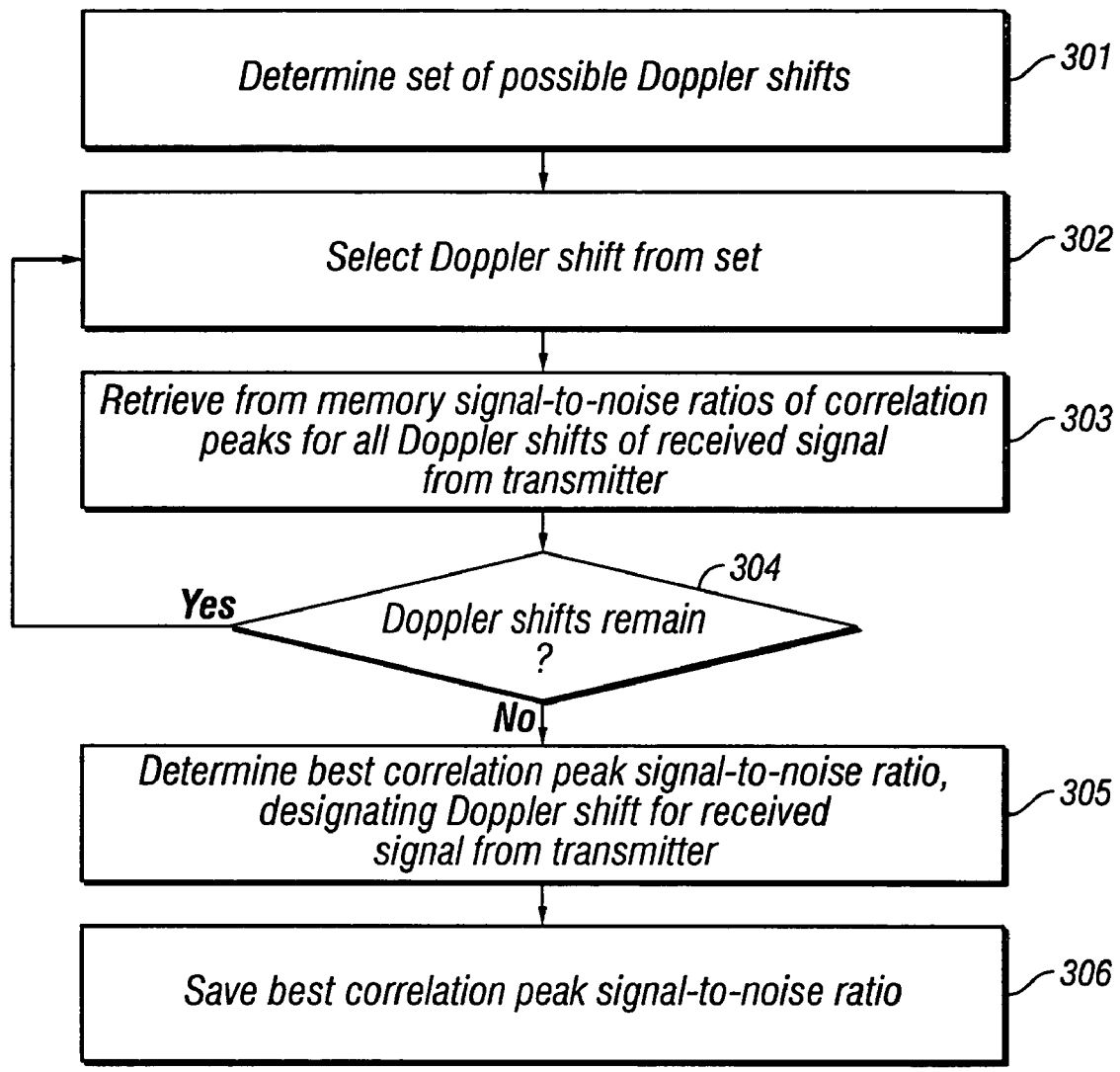
FIG. 5C is a flowchart illustrating the processing steps of a receiver processor for an embodiment of the method of the invention for determining a properly-compensating Doppler shift, source transmitter identity, and travel time for a received signal at a position-determining receiver under the control of the receiver processor.

FIG. 5C is a flowchart illustrating the processing steps of a receiver processor for an embodiment of the method of the invention for determining a properly-compensating Doppler shift, source transmitter identity, and travel time for a received signal at a position-determining receiver under the control of the receiver processor.

At step 301, the receiver processor determines a set of possible Doppler shifts to compensate for Doppler effects on the received signal selected in step 202 of FIG. 5B.

At step 302, the receiver processor selects one of the Doppler shifts from the set of possible Doppler shifts determined in step 301.

At step 303, the receiver processor retrieves from memory the correlation signal to correlation noise ratios of the correlation peaks for all the Doppler shifts selected in step 302 for one received signal selected in step 202 of FIG. 5B for one transmitter selected in step 204 of FIG. 5B. In the embodiment being illustrated, these correlation signal to correlation noise ratios are obtained from the processing that is performed in the flowchart in FIG. 5D. In particular, the correlation signal to correlation noise ratios of the correlation peaks for all the Doppler shifts are saved in memory in step 406 of FIG. 5D.

At step 304, the receiver processor determines if there are any remaining Doppler shifts left to check from the set of possible Doppler shifts determined in step 301. If the answer is yes, there are Doppler shifts left to check, then the process returns to step 302. If the answer is no, there are no Doppler shifts left to check, then the process continues to step 305.

At step 305, the receiver processor determines which of the correlation signal to correlation noise ratios of the correlation peaks from step 303 is the best. The Doppler shift yielding this best correlation peak signal-to-noise ratio is designated as the properly-compensating Doppler shift for the received signal from the selected transmitter.

At step 306, the receiver processor saves the correlation signal to correlation noise ratio of the correlation peak determined in step 305 as corresponding to the properly Doppler-shifted received signal from the selected transmitter. The selected transmitter corresponding to this saved correlation signal to correlation noise ratio is determined in step 207 of FIG. 5B and designated as a possible source transmitter for the received signal selected in step 202 of FIG. 5B. This transmitter is combined with any other transmitters designated as possible source transmitters for the selected received signal in step 207 of FIG. 5B, after the transmitters are determined to correspond to the correlation signal to correlation noise ratios in step 305.

Thus, in the flowchart in FIG. 5C, the selected receiver processor determines the properly-compensating Doppler shift for one selected received signal from one selected transmitter to one selected position-determining receiver. The final flowchart in FIG. 5D demonstrates how the receiver processor calculates this information within the same iteration step.

Figure 5D:
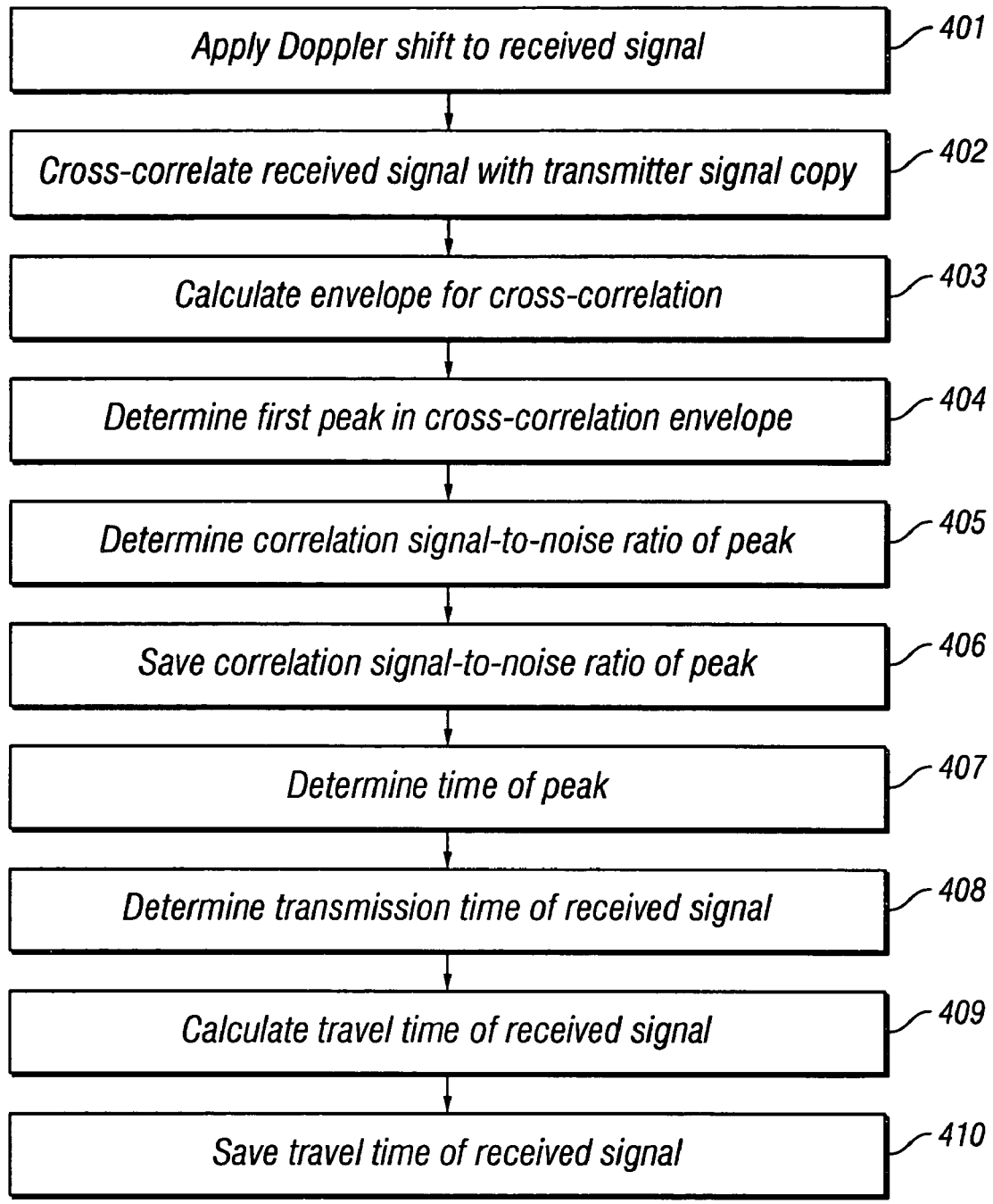
FIG. 5D is a flowchart illustrating the processing steps of a receiver processor for an embodiment of the method of the invention for calculating a selected Doppler shift and a resulting travel time for a selected received signal from a selected transmitter to a position-determining receiver under the control of the receiver processor.

FIG. 5D is a flowchart illustrating the processing steps of a receiver processor for an embodiment of the method of the invention for calculating a selected Doppler shift and a resulting travel time for a selected received signal from a selected transmitter to a position-determining receiver under the control of the receiver processor.

At step 401, the receiver processor applies the Doppler shift selected in step 302 of FIG. 5C to the received signal selected in step 202 of FIG. 5B. The receiver processor applies the selected Doppler shift by removing data samples from or adding data samples to the received signal, according to whether the received signal is being compressed or expanded, respectively, by Doppler effects.

At step 402, the receiver processor calculates a cross-correlation of the Doppler-shifted received signal from step 401 with the copy of the transmitted signal received in step 104 of FIG. 5A for the transmitter selected in step 204 of FIG. 5B.

At step 403, the receiver processor calculates an envelope for the cross-correlation calculated in step 402.

At step 404, the receiver processor determines a peak in the correlation envelope calculated in step 403. Preferably, the receiver processor applies a peak detection algorithm to determine the first peak with sufficient signal-to-noise ratio to be significantly detectable within the time window of the position-determining receiver, received from the main processor in step 103 of FIG. 5A.

At step 405, the receiver processor determinates the correlation signal to correlation noise ratio of the peak determined in step 404. The term correlation signal to correlation noise ratio is used here to mean the ratio of the signal in the correlation envelope to the noise in the correlation envelope, as measured at the first detectable peak in the correlation envelope.

At step 406, the receiver processor saves the correlation signal to correlation noise ratio of the peak determined in step 405, as corresponding to the selected Doppler shift for the received signal from the selected transmitter. This saved correlation signal to correlation noise ratio is compared in step 305 of FIG. 5C to other saved correlation signal to correlation noise ratios determined in step 405 to determine the properly-compensating Doppler shift for the received signal from the selected transmitter.

At step 407, the receiver processor determines a time for the correlation peak determined in step 404. The time of the peak is designated as the arrival time of the Doppler-shifted received signal calculated in step 401 from the selected transmitter.

At step 408, the receiver processor determines the time of transmission of the Doppler-shifted received signal calculated in step 401. The receiver processor determines the time of transmission of the Doppler-shifted received signal from the triggering schedule for the selected transmitter, received from the main processor in step 103 of FIG. 5A.

At step 409, the receiver processor calculates the travel time of the Doppler-shifted received signal between the selected transmitter and the position-determining receiver. The receiver processor calculates the travel time by calculating the difference between the arrival time determined in step 407 of the Doppler-shifted received signal and the transmission time determined in step 408 of the Doppler-shifted received signal.

At step 410, the receiver processor saves the travel time calculated in step 409 of the Doppler-shifted received signal between the selected transmitter and the position-determining receiver.

Thus, in the above flowchart in FIG. 5D, the receiver processor calculates and saves in memory one correlation signal to correlation noise ratio and one resulting travel time for one selected Doppler-shifted received signal from one selected transmitter to one selected position-determining receiver.

The preceding flowcharts in FIGS. 5A to 5D merely illustrate a detailed description of one specific embodiment of the method of this invention and this illustration is not meant to limit the scope of the invention.

Figure 6A:
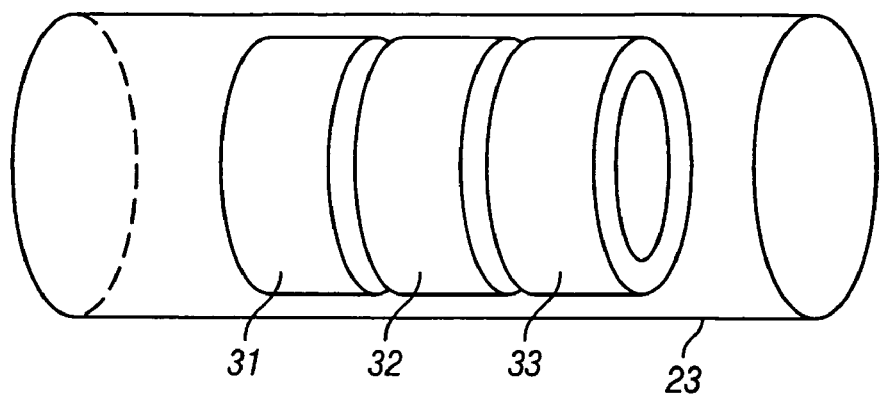
FIG. 6A is a side schematic view of a broad band transmitter, as mounted in a streamer, according to one embodiment of the invention.
Figure 6B:
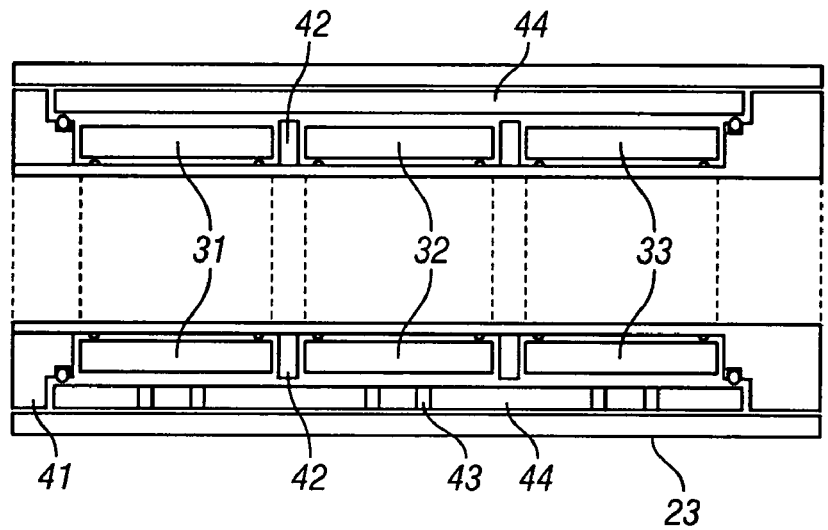
FIG. 6B is a side sectional view of the transmitter of FIG. 6A.
Figure 6C:
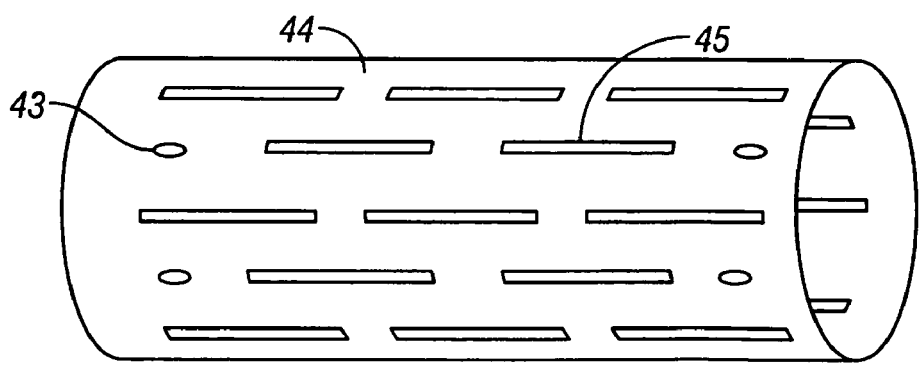
FIG. 6C is a side perspective view of the protective tube used in the transmitter of FIG. 6B.

FIGS. 6A, 6B, and 6C illustrate different views of a transmitter suitable for use within the system of the invention. In one embodiment, the transmitter comprises one or more transmitter ring elements of piezoelectric material. If more than one ring is used, then the material properties may differ so that the overall frequency range of the transmitter becomes broader than for a single transmitter ring. The particular embodiment with three transmitter ring elements will be illustrated here.

FIG. 6A is a side schematic view of a broad band transmitter, as mounted in a streamer, according to one embodiment of the invention. FIG. 6A illustrates a symmetrical transmitter design based on three piezoelectric tube elements of approximately equal diameters, positioned collinearly within the streamer skin 23. Both the diameters of and the speed of sound in outer tubes 31, 33 are substantially equal, giving close resonance frequencies. The diameter of center tube 32 is approximately the same as for the two outer tubes 31, 33. However, the speed of sound in the center tube 32 differs from the speed of sound in the two outer tubes 31, 33 by 10% or more, resulting in more than 10% difference in resonance frequencies between the center tube 32 and the outer tubes 31, 33. Outer tubes 31, 33 are operated together, and used for transmission in a first frequency band around their resonance frequency. Center tube 32 is used for transmission in a second frequency band different from the first frequency band of outer tubes 31, 33. This design results in a combined bandwidth wider than the bandwidth of a single tube and with a beam pattern that has the same origin for both frequency bands. This embodiment of the invention increases the bandwidth of the transmitted signal.

In one embodiment, the tubes 31, 32, 33 can be used for signal transmission on one frequency band at a time, or, in another embodiment, used on both frequency bands simultaneously. In particular, the tube 32 with the highest resonance frequency can be located in the center, and the tubes 31, 33 with lower resonance frequencies can be placed symmetrically to each side of the tube 32, in order to increase the bandwidth of the transmitter. In yet further embodiments, further pairs of tubes (not shown), each pair with a resonance frequency different from previous tubes, may be added symmetrically, one on each side of the design described above, to increase the combined bandwidth further.

FIG. 6B is a side sectional view of the broad band transmitter shown in FIG. 6A. A protective tube 44 perforated with holes 43 is used to protect the brittle piezoelectric transmitter tubes 31, 32, 33 when the streamer is affected by large external forces due to handling on deck or in water. These external forces arise, for example, when the streamer cable is rolled over pulleys or wheels as the streamer cable is deployed from or retrieved onto the survey vessel, or stored on streamer winches on board the survey vessel. Under normal operational conditions, the protective tube 44 is in fluid and is substantially decoupled, both acoustically and mechanically, from the internal structure of the broad band transmitter. When large radial forces are applied to the streamer skin 23, support elements 41 and 42 will stop the protection tube 44 from reaching the piezoelectric transmitter tubes 31, 32, 33.

FIG. 6C is a side view of the protective tube 44 shown in the transmitter of FIG. 6B. FIG. 6C illustrates that the protective tube 44 can be perforated with holes 43 that allow for fluid flow through the holes 43, in order to equalize ambient pressure on the inside and outside of the tube 44. The protection tube 44 can further be perforated with slots 45 parallel to the streamer axis, so that the radial mode resonance of the protective tube 44 is moved out of the frequency band of the transmitters.

Figure 7A:
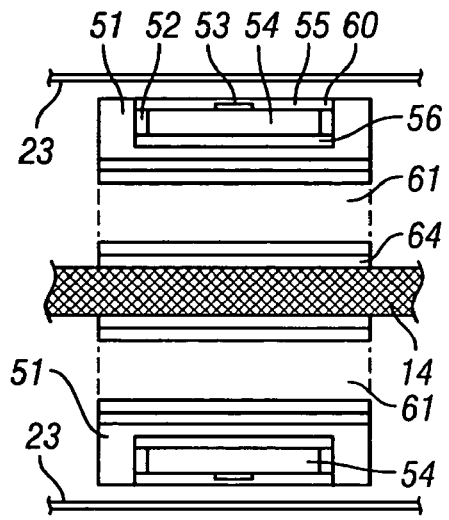
FIG. 7A is a side sectional view of a broad band receiver, according to an embodiment of the invention.
Figure 7B:
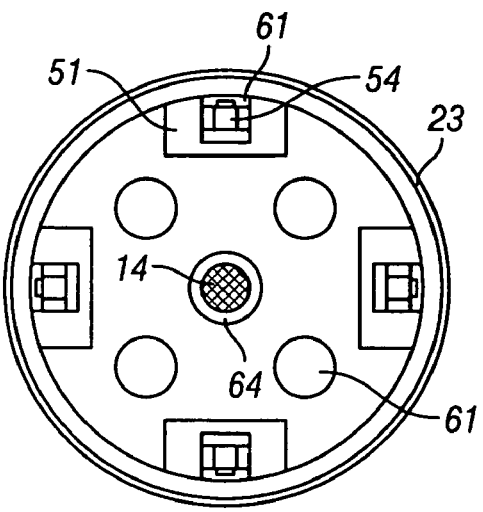
FIG. 7B is a cross-sectional view of the receiver of FIG. 7A.
Figure 7C:
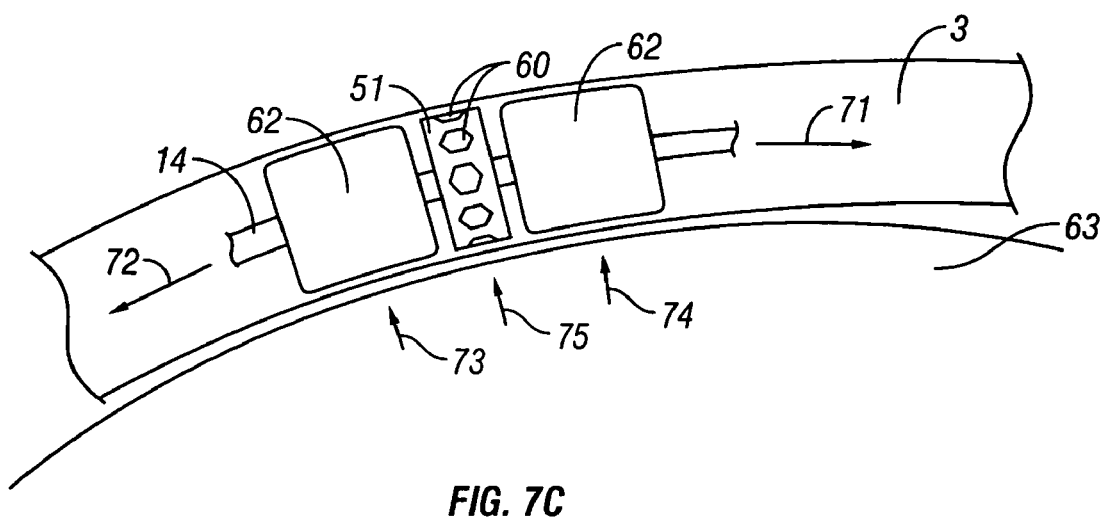
FIG. 7C is a side schematic view of the receiver of FIGS. 7A and 7B, as mounted in a streamer.

FIGS. 7A, 7B, and 7C illustrate different views of a receiver suitable for use within the system of the invention. In one embodiment, the receiver may consist of one or more piezoelectric ring elements, similar to the design of the transmitter illustrated in FIGS. 6A, 6B, and 6C, above. Here, however, an alternative embodiment will be illustrated for the design of the receiver, in which a series of transducer disk elements are placed around the circumference of a circular mechanical structure. If several transducer elements are used, the signals from these may be added together. The use of several small transducer elements puts the resonances of piezoceramic elements well outside the frequency band of interest for the receivers, which is typically 10 kHz to 40 kHz.

FIG. 7A is a side sectional view of a broad band acoustic receiver, according to an embodiment of the invention. FIG. 7A illustrates an omni-directional acoustic receiver design employing one or more small piezoceramic elements 54 mounted in cavities 60 in a hydrophone assembly 51. A high-frequency broad band hydrophone for in-streamer mounting can be implemented by placing piezoceramic elements 54 at a plurality of locations under the circumference of the streamer skin 23 to detect the ambient pressure at these locations. The signals from all elements are added to form one output signal. As the dimension of the piezoceramic elements 54 is small, it is possible to achieve an almost flat sensitivity response in the frequency band of interest, typically 10 kHz to 40 kHz. The electrical bundle 14 and other streamer structural elements such as tension ropes may be inserted through a central hole 64 and through additional holes 61 in the hydrophone assembly 51.

FIG. 7B is a cross-sectional view of the acoustic receiver of FIG. 7A. FIG. 7B illustrates an embodiment in which each piezoceramic element 54 is mounted in a cavity 60 in the hydrophone assembly 51. Thus, local stress and bending forces are minimized when the streamer 3 is affected by large lateral forces, such as during handling in water or onboard the vessel, as described above in reference to FIG. 6B. A piezoceramic element 54 can withstand high positive pressure, but can not handle negative pressure well, and thus breaks easily when bending forces are applied. The hydrophone assembly 51 has holes 61, which are illustrated as circles here, but this shape is not intended as a limitation of the invention. The holes 61 allow in-line movements of the hydrophone assembly 51 in the streamer 3. Under normal operational conditions, the hydrophone assembly 51 is substantially decoupled, both acoustically and mechanically, from the internal structure of the streamer 3.

Referring again to FIG. 7A, concentrated stress on an element 54 is avoided by using compliant conducting tapes 53, 56 instead of conventional soldered wire connections to the electrodes of the piezoceramic elements 54. The conducting tape 53, 56 can be made of any appropriate compliant material, such as copper, that deforms slightly under pressure and thus equalizes the pressure over the piezoceramic surface. A layer of plastic material 55 covers the outside of the piezoceramic element 54. This material 55 and the streamer skin 23 deform slightly under external pressure and distribute the externally applied forces (73, 74, 75 in FIG. 7C) over the surface of the piezoceramic element 54. A soft compliant material 52 is used to allow the element 54 to expand laterally when pressure (71, 72 in FIG. 7C) is applied to the element front surface. This is a common procedure used to increase sensitivity, compared with the case commonly referred to as clamped thickness mode, where the element 54 is not allowed to expand laterally.

FIG. 7C is a side schematic view of the acoustic receiver of FIGS. 7A and 7B, as mounted in a streamer. FIG. 7C illustrates an embodiment in which the hydrophone assembly 51 is placed between two spacers 62, generally centered on the electrical bundle 14. The hydrophone assembly 51 has a smaller diameter than the spacers 62, which will then carry most of the external forces 73, 74, 75 when the streamer 3 is rolling over wheels 63 during streamer 3 deployment or retrieval, protecting the piezoceramic elements within the cavities 60 in the hydrophone assembly 51.

The system of the invention is a stand-alone acoustic method for determining streamer positions with high degree of built-in redundancy. Acoustic broadband signals operating at frequencies at the lower part of the ultrasonic band, typically 10 kHz to 40 kHz, are generated and transmitted in sequential order from transmitters within a subset of streamer sections of the parallel towed streamers. The acoustic signals are detected by a different subset of receivers, processed, and the propagation times between a high number of acoustic transmitter and receiver combinations determined. Accurate timing control is provided to synchronize all transmit and receiving events. The corresponding distances between the transmitter and receiver combinations are computed, and a geographical network representation of the complete seismic streamer spread can be found. Relative positions of the seismic equipment within the towed streamers are then determined.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A system for determining relative positions of a plurality of towed marine seismic streamers, comprising:
    a plurality of acoustic transmitters, mounted inside the streamers, adapted to transmit broadband signals having low cross-correlation between the signals of different transmitters;
    a plurality of acoustic receivers, mounted inside the streamers, said receivers being adapted to receive the signals transmitted in an in-line direction between transmitters and receivers mounted in the same streamer and to receive signals transmitted in a cross line direction between transmitters and receivers mounted in different streamers;
    at least one receiver processor adapted to cross-correlate the signals received at the receivers with copies of transmitter signals to determine identities of transmitters of the received signals and travel times of the received signals; and
    a main processor adapted to convert the travel times to distances between the identified transmitters and the receivers, to determine in-line distances along streamers between transmitters and receivers in the same streamer, and cross line distances between transmitters and receivers in different streamers, to combine the converted distances to form a trilateration network representation of the distances between the transmitters and the receivers, to solve the trilateration network representation to determine the relative positions of the transmitters and the receivers in the streamers, including position changes resulting from stretching of the steamers as well as position changes resulting from movement of the streamers, and to determine relative positions of the streamers from the relative positions of the transmitters and receivers.

2. The system of claim 1, wherein the receivers are employed exclusively for determining the positions of the streamers.

3. The system of claim 1, wherein:
    the main processor is adapted to transmit time synchronization signals to transmitter processors adapted to control the transmitters;
    the main processor is adapted to transmit triggering schedules for transmitting signals to the transmitter processors; and
    the transmitter processors are adapted to employ the time synchronization signals and the triggering schedules to control transmitting the signals from the transmitters.

4. The system of claim 3, wherein the main processor is adapted to employ the time synchronization signals and the triggering schedules to measure the travel times between the transmitters and the receivers.

5. The system of claim 1, wherein:
    the main processor is adapted to transmit time synchronization signals to the receiver processors;
    the main processor is adapted to transmit time windows for listening for the signals to the receiver processors; and
    the receiver processors are adapted to employ the time synchronization signals and the time windows to control receiving the signals by the receivers.

6. The system of claim 1, wherein the receiver processors are adapted to compensate the received signals for Doppler effects.

7. The system of claim 1, wherein the receiver processors are adapted to store copies of the transmitter signals.

8. The system of claim 1, wherein the receiver processors are adapted to generate copies of the transmitter signals.

9. The system of claim 1, further comprising:
    sound velocity sensors deployed along the streamers, adapted to determine a local sound velocity in water; and wherein:

the main processor is adapted to employ the local sound velocity in water to convert the travel times to distances.

10. The system of claim 1, wherein the transmitters and the receivers are adapted to operate in a frequency band of approximately 10 to 40 kHz.

11. The system of claim 1, wherein the processor is further adapted to determine absolute reference positions on the streamers; and employ the absolute reference positions to determine absolute positions of the streamers from the relative positions of the streamers.

12. A method for determining relative positions of a plurality of towed marine seismic streamers, comprising:
towing a plurality of acoustic transmitters mounted inside the streamers, wherein the transmitters are adapted to transmit broadband signals having low cross-correlation between the signals of different transmitters;
towing a plurality of acoustic receivers mounted inside the streamers, wherein the receivers are adapted to receive the signals of the transmitters transmitted in the in-line direction between transmitters and receivers mounted in the same streamer and to receive signals transmitted in a cross line direction between transmitters and receivers mounted in different streamers;
transmitting the signals from the transmitters;
receiving the signals at the receivers;
cross-correlating the received signals with copies of transmitter signals to determine identities of transmitters of the received signals and to determine travel times of the received signals;
converting the travel times to distances between the identified transmitters and the receivers, to determine in-line distances along streamers between transmitters and receivers in the same streamer, and cross line distances between transmitters and receivers in different streamers;
combining the converted distances to form a trilateration network representation of the distances between the transmitters and the receivers;
solving the trilateration network representation to determine the relative positions of the transmitters and receivers in the streamers, incuding position changes resulting from stretching of the streamers as well as position changes resulting from movement of the streamers, and to determine relative positions of the streamers from the relative positions of the transmitters and receivers.

13. The method of claim 12, wherein the receivers are employed exclusively for determining the positions of the streamers.

14. The method of claim 12, wherein the step of transmitting the signals further comprises:
transmitting time synchronization signals to transmitter processors controlling the transmitters;
transmitting triggering schedules for transmitting signals to the processors; and
employing the time synchronization signals and the triggering schedules in the transmitter processors to control transmitting the signals from the transmitters.

15. The method of claim 14, wherein the step of receiving the signals further comprises:
transmitting time synchronization signals to receiver processors controlling the receivers;
transmitting time windows for listening for the signals to the receiver processors; and
employing the time synchronization signals and the time windows in the receiver processors to control receiving the signals by the receivers.

16. The method of claim 14, the step of converting the travel times to distances further comprises:
employing the time synchronization signals and the triggering schedules in the processors to calculate travel times between transmitters and receivers.

17. The method of claim 12, wherein the step of cross-correlating the received signals further comprises:
compensating the received signals for Doppler effects.

18. The method of claim 12, wherein the step of cross-correlating the received signals further comprises:
storing copies of the transmitter signals in processors.

19. The method of claim 12, wherein the step of cross-correlating the received signals further comprises:
generating copies of the transmitter signals in processors.

20. The method of claim 12, wherein the step of converting the travel times to distances further comprises:
deploying sound velocity sensors to determine a local sound velocity in water; and
employing the local sound velocity in water to convert the travel times to distances.

21. The method of claim 12, wherein the transmitters and receivers operate in a frequency band of approximately 10 to 40 kHz.

22. The method of claim 12, further comprising:
determining absolute reference positions on the streamers; and
employing the absolute reference positions to determine absolute positions of the streamers from the relative positions of the streamers.

* * * * *